United States Patent [19]

Gagnon et al.

[11] Patent Number: 5,510,213
[45] Date of Patent: Apr. 23, 1996

[54] METHOD OF PREPARING ELECTRODES FOR LEAD-ACID ELECTRODE BATTERY

[75] Inventors: Eugene G. Gagnon, Utica; Daniel J. Lisi, East Detroit, both of Mich.

[73] Assignee: General Motors Corporation, Detroit, Mich.

[21] Appl. No.: 340,509

[22] Filed: Nov. 16, 1994

[51] Int. Cl.$^6$ .................................................... H01M 4/56
[52] U.S. Cl. ........................ 429/225; 429/218; 429/227; 429/228; 429/226; 423/619; 29/623.1; 29/623.5
[58] Field of Search ................................. 429/218, 225, 429/227, 228, 226; 423/619; 29/623.1, 623.5

[56] References Cited

U.S. PATENT DOCUMENTS

| | | | |
|---|---|---|---|
| 3,751,301 | 8/1973 | Kilduff | 136/26 |
| 3,765,943 | 10/1973 | Biagetti | 136/26 |
| 4,188,268 | 2/1980 | Sugahara et al. | 429/228 |
| 4,218,527 | 8/1980 | Mellors et al. | 429/191 |
| 4,381,250 | 4/1983 | Rittenhouse | 252/182.1 |
| 4,415,410 | 11/1983 | Reich | 429/227 |
| 4,507,855 | 4/1985 | Moseley et al. | 29/623.1 |
| 4,508,147 | 4/1985 | Moseley et al. | 29/623.5 |
| 4,656,706 | 4/1987 | Mahato et al. | 429/228 |
| 4,689,571 | 8/1987 | Yonezu et al. | 324/432 |
| 4,713,304 | 12/1987 | Rao et al. | 429/136 |
| 5,252,105 | 10/1993 | Witherspoon et al. | 29/623.1 |
| 5,314,766 | 5/1994 | Witherspoon et al. | 429/227 |

OTHER PUBLICATIONS

H. Bode, "Lead Acid Batteries", New York, John Wiley and Sons, 1977.

D. Pavlov and E. Bashtavelova, "A Model of the Structure of the Positive Lead–Acid Battery", J. Electrochem Society, vol. 131, No. 7, Jul. 1984.

Chemical Selects: Batteries & Fuel Cells, No. 24, 1988.

D. Pavlov and N. Kapkov, "Lead–Acid Battery Pastes Containing $4PbO \cdot PbSO_4$ and $Pb_3O_4$", J. Electrochem Society, vol. 137, No. 1, Jan. 1990.

*Primary Examiner*—Bruce F. Bell
*Attorney, Agent, or Firm*—Lawrence B. Plant

[57] ABSTRACT

The invention provides an electrode for a lead-acid battery, formed in an essentially continuous process without the need for curing under controlled temperature and humidity conditions. This is accomplished by using a relatively high metallic lead content precursor powder intermingled with a leady-oxide powder. Another aspect of the invention is the use of relatively high surface area leady-oxide powder which contributes to performance. Another important aspect of the invention is that the active material paste is prepared without the use of an acid in a water based process which provides a simpler pasting chemistry. The process eliminates the complex basic lead sulfate reactions found in present methods.

9 Claims, 6 Drawing Sheets

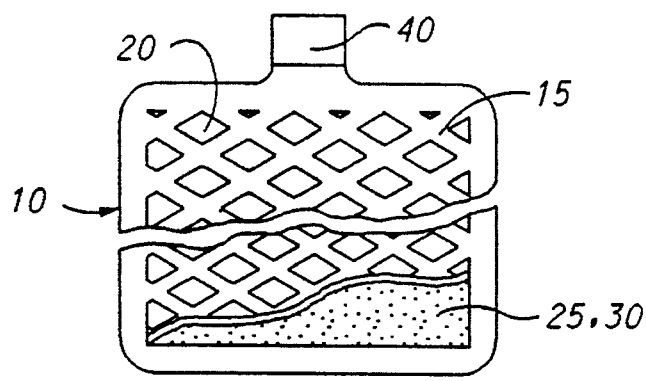
Fig. 2
Fig. 3
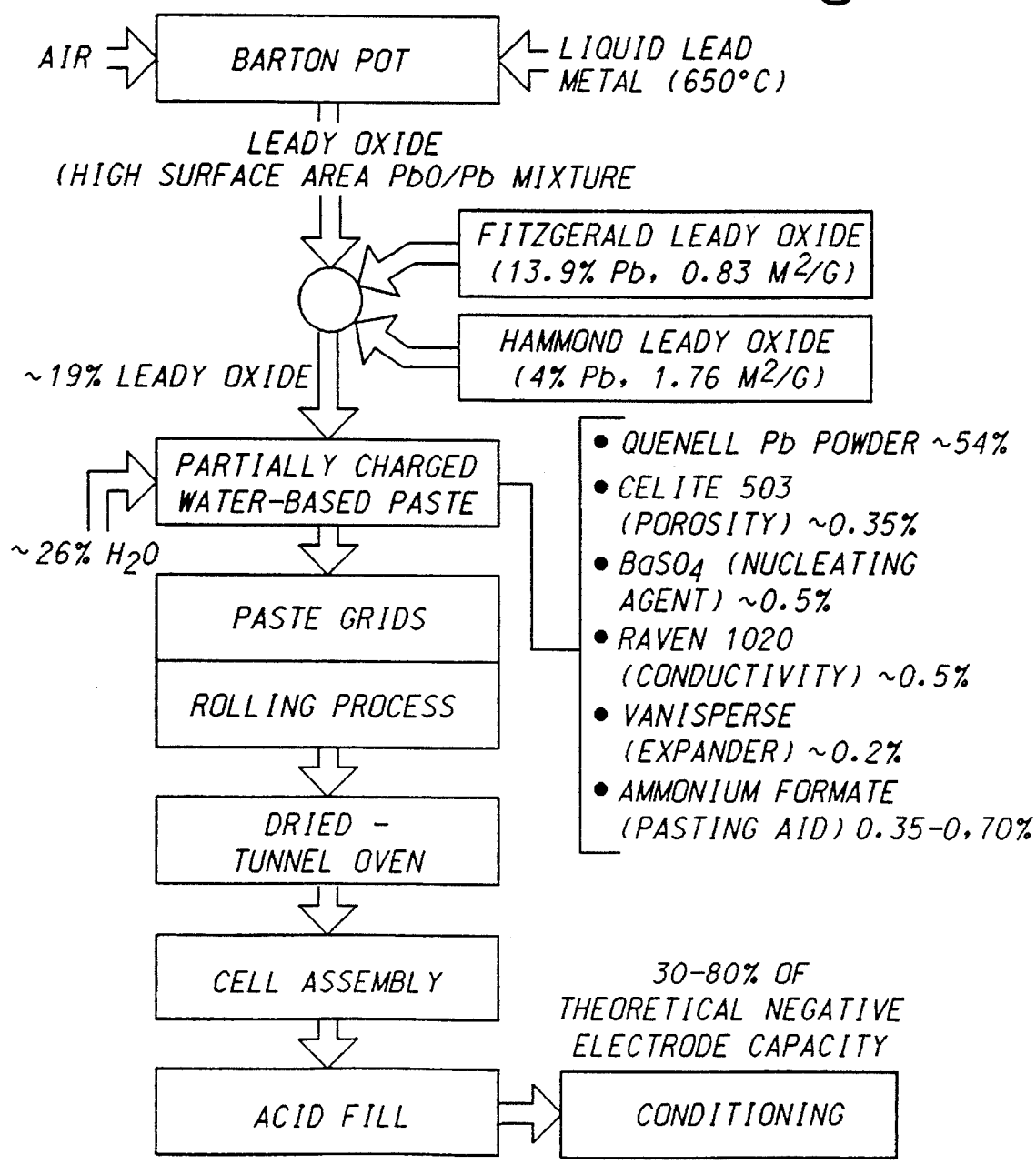

METHOD OF PREPARING ELECTRODES FOR LEAD-ACID ELECTRODE BATTERY

FIELD OF THE INVENTION

This invention relates to electrodes of lead-acid batteries and to a method of their manufacture.

BACKGROUND OF THE INVENTION

Automotive type lead-acid batteries have interlaced positive and negative electrodes, also called plates. Each plate consists of special material, known as active material, supported on lead alloy grids. The active material is formed from lead oxide pastes which are processed to a firm, porous form.

In the preparation of plates for a lead-acid battery, a mixture is formed comprising oxides of lead, sulfuric acid, water, and various additives. Conventional processes for preparing negative electrodes entail handling quantities of sulfuric acid as part of the pasting material, and complex basic lead sulfate reactions resulting in little control over the chemistry of the paste which changes during the process.

Precursor paste containing the active material is applied to conductive lead grids and, using conventional methods, the freshly pasted plates are cured for several days, typically 4 days at controlled temperature and humidity, as shown in a typical prior art process schematically shown in FIG. 1. The curing steps of current processes are time consuming and often lead to irregular product quality due to the changing chemistry of the active material from paste preparation through pasting of grids and curing and during pickling reactions.

It is a general object of the invention to provide a new process for preparing electrodes which produces a more consistent product and which is less time consuming and more efficient.

SUMMARY OF THE INVENTION

There is provided an electrode for a lead-acid battery, formed in an essentially continuous process without the need for curing under controlled temperature and humidity conditions.

The general procedure for preparing electrodes includes forming a first powder which is a lead-based powder and forming a second powder which is a leady-oxide powder. The first powder (lead-based powder) has a metallic lead content which is at least about 80% by weight (w/o), desirably at least 85 w/o, more desirably at least about 90 w/o, and preferably about 95 w/o or greater. The second powder (leady-oxide powder) has a lead-oxide content which is at least about 70 w/o, desirably at least about 80 w/o, more desirably at least about 85 w/o, and preferably at least about 90 w/o, and most preferably about 95 w/o or greater. Formulations were prepared having preferred relative amounts of the first and second powders. On the basis of 100 parts by weight of total powder such preferred formulations had 73 to 75 parts of the lead-based powder and 25 to 27 parts of the leady-oxide powder. Broader ranges encompassing these preferred amounts are also thought to be suitable based on criteria described further hereinbelow. Generally, the greater the amount of the lead-based powder, the greater is the precharge. The two powders are combined with water. It is preferred that the wet mixture further include a number of additives that are thought to improve electrode performance. Raven 1020 carbon black is a typical carbon powder that is used in the mixture to enhance electrode conductivity. Barium sulfate is used a nucleating agent. Celite 503 (silica) is used as a pore former. Vanisperse (a lignin sulfonic acid) was used as an expander material. Ammonium formate was found to be an essential pasting aid which permitted attainment of a suitable consistency.

The wet mixture containing the powders additives and water is applied to electrode grids. The applied active material mixture is then dried, preferably air dried, so as to prevent formation of cracks which may develop in the active material if it is dried too quickly. Cells are prepared by assembling the negative electrode plates interlaced with positive electrode plates in a container with a liquid electrolyte such as Sulfuric acid.

An important aspect of the invention is the use of a relatively high metallic lead content precursor powder intermingled with a leady-oxide powder. Another aspect of the invention is the use of relatively high surface area leady-oxide powder which contributes to performance. Another important aspect of the invention is that the active material paste is prepared without the use of an acid in a water based process which provides a simpler pasting chemistry. The process eliminates the complex basic lead sulfate reactions found in present methods.

Accordingly, the invention provides an electrode for a lead-acid battery and the method of making which improves consistency of the product, essentially eliminates hard to control curing steps, provides fabrication of an electrode in an essentially continuous process, simplifies production, and eliminates the need for an acid based active material.

These and other objects, features, and advantages will become apparent from the following description of the preferred embodiments, claims, and accompanying drawings.

BRIEF DESCRIPTION OF THE DRAWINGS

FIG. 2 is a schematic drawing of an electrode for a battery.

FIG. 3 is a flow diagram showing some of the important steps of a process according to one aspect of the invention to produce partially or fully charged, cureless negative electrode.

DETAILED DESCRIPTION OF THE PREFERRED EMBODIMENTS

Figure 1:
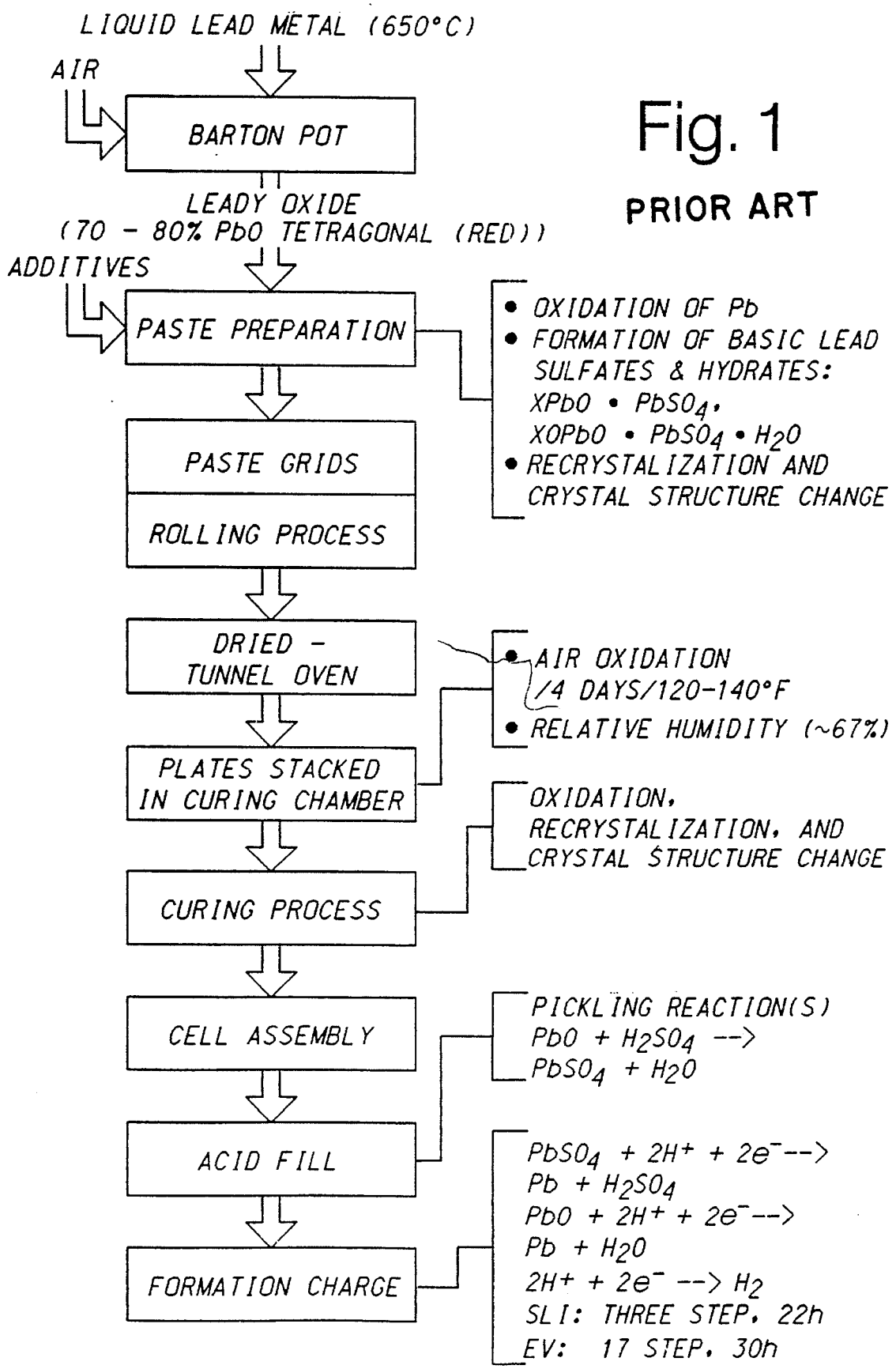
FIG. 1 is a schematic of a prior art conventional process for forming an electrode.

FIG. 2 shows a schematic drawing of an electrode 10 for use in a lead-acid battery. The electrode has a lead based alloy substrate 15 which is the form of a grid with recesses 20. The substrate grid 15 has surface oxides of lead. A coating 25, comprising an active material 30 is applied to one or both sides of the grid 15. In experiments described below both sides were coated. A tab 40 provides a terminal.

Electrodes 10 were made from standard production grids 15 available from Delco Remy. These grids 15 are of a typical Pb/Sn alloy formulation with a minor amount of 1.0 w/o Sn and 0.7 w/o Cu. A typical grid has thickness of about 0.034 inches (0.0864 centimeters). A test electrode was fabricated from grids that had been cut out of standard, full size, bare, Delco Remy negative grids. Twelve of grid squares were pasted using procedures as described below, giving a geometric area of about 11.5 centimeters. Larger, full sized electrodes were also tested using lead-acid SLI type grids provided by Delco Remy. The pasted area was about 12.6 centimeters by about 8.5 centimeters which corresponds to a geometric area of about 214 centimeters squared. The smaller electrodes were used primarily for a screening purpose before scaling up to the larger size.

The general procedure for preparing negative electrodes by the method of the invention includes forming an aqueous mixture of a lead-based powder and a leady-oxide based powder. The preferred mixture has, on the basis of 100 parts by weight of total powder about 50 to 55 parts lead-based powder, 18 to 19 parts the leady-oxide powder, and the balance was 26 to 27 parts water, plus additives. Additives are included in the mixture to control porosity, conductivity, and the cycling characteristics of the electrode, and also to control the rheology of the paste material. The mixture is applied to the above described grid and then dried. The method of the invention forms an active material comprised of the two powders where the active material is precharged as formed. That is, in an initial condition it is at least partially charged.

In a preferred process as shown in FIG. 3, after the active material paste is applied to the grid it is preferably pressed by rollers to a desired thickness with a substantially flat surface, air dried and then assembled in a cell interlaced with the positive electrodes. In a last step the completed cell undergoes electrode conditioning.

It is preferred to use one of two types of leady-oxides, each of the types has a metallic lead content of less than about 20 w/o, desirably less than about 15 w/o, preferably less than about 10 w/o, and most preferably less than about 5 w/o. The first type of leady oxide used is a mixture of Pb/PbO having a Pb content less than about 20 w/o and often the PbO content is in a range of 80 w/o to 90 w/o. The second type of leady-oxide used is a $Pb_3O_4$ formulation having a metallic lead content less than about 10 w/o. The lead powder typically has 95% by weight (w/o) of lead in the metallic lead form.

It is preferred that the leady-oxide (Pb/PbO) have a BET surface area of at least about 0.10 meter square per gram, a suitable composition has about 0.83 meters. The $Pb/Pb_3O_4$ leady-oxide preferably has a surface area of at least about 1 meter square per gram, a suitable composition has 1.75 meters square per gram. It is preferred that the lead powder have a BET surface area of at least about 0.10 meter square per gram, a suitable area is about 0.12 meters to about 0.6 meters square per gram.

Formulations were prepared having a preferred relative amounts of the powders. On the basis of 100 parts by weight of total powder such formulations had 73 to 75 parts of the lead-based powder and 25 to 27 parts of the leady-oxide powder. Accordingly, the formulation has about 70 to 75 parts by weight lead-based powder (high metallic lead content); and about 25 to 30 parts by weight of the leady-oxide powder. Broader ranges encompassing these preferred amounts are also thought to be suitable based on applying certain criteria. The lead-based powder provides the advantage of precharge, therefore, the amount of precharge will depend on the relative amount of lead-based powder having the high metallic lead content which is at least 85 w/o, desirably at least 90 w/o, and preferably 95 w/o or greater. Thus, the proportions of the two powders described herein could be reversed. The preferred proportions of the two powders is one that has a greater amount of the lead-based powder as compared to the leady-oxide. The metallic lead-based powder should constitute a major portion of the total weight of the two powders, that is more than 50 w/o, a range of 60 to 80 w/o and preferably 65 to 80 w/o are thought to be suitable. The leady-oxide provides relatively high surface area required for high utilization and cycle life, therefore, it should be present in quantities on the order of 20 w/o, and more may be desired, for example, 20 to 35 w/o. It should be noted that as used herein the term "major portion" refers to an amount being greater in quantity in reference to a minor and lesser quantity and the term "major constituent" refers to a constituent element or compound being present in greater quantity than any other element or compound. The term majority refers to more than half.

The amount of water included in the paste could be less than the 26 w/o to 27 w/o stated earlier. It is perhaps even desirable to be less. The quantity of water included in the paste is not critical and amount sufficient to achieve dispersion of the powders and ease of pasting is needed. The lesser ingredients (additives) are present in relatively small quantities and can be varied to a significant degree without unduly changing the character of the process or result. Celite is thought to be the most important additive; doubling or tripling its amount compared to the values of the examples should prove advantageous. Characteristics of the starting materials and reagents are as given in the Table 1 entitled Physical Characteristics of the Starting Materials.

TABLE 1

PHYSICAL CHARACTERISTICS OF THE STARTING MATERIALS

1. Quenell Metallic (95%) lead powder (Quenell Enterprises, Inc.) Particle size −325 mesh with an apparent density of 3.75 g/cm$^2$ and a BET surface area of 0.12 m$^2$/g.
2. Reagent grade (Fisher Scientific) ammonium formate, $NH_4COOH$.
3. Reagent grade (Fisher Scientific) sodium sulfate, $Na_2SO_4$.
4. Barium sulfate, $BaSO_4$ (Delco Remy Division).
5. Delox leady-oxide (Delco Remy Division), Pb/PbO mixture (about 14–26% free Pb) with a BET surface area of about 1 m$^2$/g.
6. Fitzgerald leady-oxide (Delco Remy Division), Pb/PbO mixture (about 19% free lead) with a BET surface area of about 0.83 m$^2$/g.
7. Hammond oxide (Hammond Lead Products, Inc.), $Pb_3O_4$ (about 4% metallic lead) with a BET surface area of about 1.76 m$^2$/g.
8. Celite 503 (Celite Corp. formerly Manville Corp.) a diatomaceous earth material consisting of an aluminosilicate skeleton with a porosity of about 85% and a BET surface area of about 1.29 m$^2$/g.
9. Vanisperse (Delco Remy Division) a lignin sulfonic acid material.
10. Raven 1020 carbon black (Columbian Chemical Corp.).

EXAMPLE 1

An active material paste for a negative lead electrode was prepared as per FIG. 2 using the materials as described in Table 1, namely, leady-oxide, metallic lead, Celite 503, Barium Sulfate, Raven 1020 brand carbon black (available from Columbian Chemical Corp.), and Vanisperse. Each of the recited components were weighed into a beaker in the proper amounts and the dry powders were thoroughly mixed with a spatula. The amount of material was calculated to give the desired electrode capacity. After the dry powders were thoroughly mixed, water was added to the dry mixture of the active material powders and then thoroughly mixed. Next, crystals of pulverized ammonium formate were added to the water solution of the lead-based active materials and the mixture was stirred with a spatula until a suitable pasting consistency was achieved. This mixing usually required less than about a minute.

It was determined that without the ammonium formate a suitable consistency was not achievable. When a suitable pasting consistency essentially like that of peanut butter was achieved, the electrode grids were hand-pasted with a spatula so that the active material was applied evenly to both sides of the grid. The paste was applied to the grid on one side and then the next. The grids were laid on absorbent towels to remove excess water. Then, the pasted grids were lightly (hand) pressed between shims and absorbent paper towels to achieve the desired electrode thickness. The electrodes were air dried overnight as it was found that if the electrodes dried too quickly such as in a heated oven cracks developed throughout the structure of the applied active material.

Various formulations were prepared as shown in Table 2 entitled Composition of Experimental Formulations. It was found during experimentation that scale up from smaller electrodes to full size electrodes followed essentially a linear relationship.

The cells designated as GMRE and GMRF (Table 2) were prepared in accordance with the method of the invention using grids that had been cut out of standard full size bare Delco Remy negatives. Twelve grid squares were pasted giving a geometric area of about 11.5 centimeters squared. The cell designated GMRD was prepared by a variation of the method which included pretreatment of the leady-oxide with acetic acid. The GMREL electrodes were prepared using the full size 214 cm$^2$ grids as per Example 2 below.

The additives are thought to improve electrode performance. Raven 1020 carbon black is a typical carbon powder that is used to enhance electrode conductivity. Barium Sulfate is used as a nucleating agent. Celite 503 (silica) is used as a pore former. Vanisperse (a lignin sulfonic acid) was used an expander material. Ammonium formate was found to be an essential pasting aid which permitted attainment of the suitable consistency.

The formulation designated GMRD was developed based upon the treatment of the Fitzgerald oxide with acetic acid. In this alternative method, an aqueous solution of 10% acetic acid was used to treat the Fitzgerald oxide. Then the Fitzgerald oxide powder so treated was washed with water, rinsed, and air dried. It was determined that it was not necessary to undergo an acetic acid treatment in order to achieve satisfactory results. The acetic acid treated Fitzgerald oxide showed a higher lead content and a lower BET area and the untreated Fitzgerald oxide showed a lower lead content and a higher BET area. The acetic acid treatment provided an electrode with performance at least as good as, or slightly better than, a standard electrode, however, it may be more expensive. The added expense would be offset by the advantage of lower pickling heat based on the acetic acid method as compared to the standard negative electrode formulations and the formulations described below.

TABLE 2

COMPOSITION OF EXPERIMENTAL FORMULATIONS
(w/o, weight percentages)

|  | GMRD | GMRE | GMRF | GMREL |
|---|---|---|---|---|
| Fitzgerald Oxide (HAc)[1] | 18.20 | — | — | — |
| Fitzgerald Oxide[2] | — | 18.60 | — | 18.60 |
| Hammond Oxide[3] | — | — | 18.70 | — |
| Quenell Lead[4] | 53.60 | 52.8 | 52.60 | 52.80 |
| Raven 1200 Carbon | 0.53 | 0.53 | 0.53 | 0.53 |
| Celite 503 | 0.36 | 0.35 | 0.35 | 0.35 |
| Barium Sulfate | 0.53 | 0.53 | 0.53 | 0.53 |
| Vanisperse | 0.18 | 0.18 | 0.18 | 0.18 |
| Water | 26.50 | 26.30 | 26.40 | 26.30 |
| Ammonium Formate | 0.35 | 0.70 | 0.70 | 0.88 |

[1] Acetic acid treated Fitzgerald oxide (87.2% Pb, 0.42 m$^2$/g
[2] Fitzgerald oxide (13.9% Pb, 0.83 m$^2$/g)
[3] Hammond oxide (4% Pb, 0.83 m$^2$/g)
[4] Quenell metallic lead powder (95.8% Pb, 0.12 m$^2$/g)

Trielectrode Cell

The experimental electrodes (GMRD, GMRE, and GMRF) were evaluated in a small plastic case between two positive electrodes in a trielectrode configuration. Typically, the experimental electrodes had a geometric area of about 11.5 cm$^2$ (both sides) and the negative electrode limited the capacity of the cell. The positive electrodes, 2.06 inches x 2.10 inches, were taken from a fully-formed lead-acid SLI (starting, lighting ignition) type grids provided by Delco Remy. The negatives were wrapped in a standard Delco Remy, Daramic separator, which had been previously boiled in distilled water for 30 minutes to remove the processing oils, rinsed in distilled water overnight, air dried, and then heat sealed at the edges. Openings in the cell cover allowed a capillary tube down along the edge of the electrode pack for Hg/Hg$_2$SO$_4$ reference electrode measurements.

Testing Conditions

The cells were filled with 1.280 specific gravity sulfuric acid electrolyte. The cells were given a conditioning cycle. The amount of (conditioning) charge required (for a particular electrode formulation and processing) to give an acceptable first discharge capacity, was determined by passing a low current (~10 mA/cm$^2$) and interrupting the current periodically to determine at what stage the OCV remained constant at about –0.96 V (versus the Hg reference electrode) for extended periods of time without decay. It is believed that much of this conditioning charge goes into developing a conducting interface between the active material in the bulk electrode and the current collector (i.e., intermetallic contact between particles and the current collector). When the electrode is properly conditioned, the negative electrodes, when subsequently discharged at 200 mA/cm$^2$ (after conditioning), typically can deliver at least 10% utilization, if so desired.

The amount of charge required to properly condition the experimental negative electrodes typically varied between 30 to 80% of the theoretical capacity of the electrode. However, this charge capacity is about half of the 200% of theoretical currently required. Accordingly, the negatives are clearly at least partially charged, and in the case of the 40% conditioning charged, the negative electrode is close to fully precharged. Maintaining the high surface area of the metallic lead throughout the various processing steps results in the amount of the conditioning charge being very low.

After conditioning the cells were continuously cycled under constant current conditions. The cells were charged at 0.1 A (8.7 mA/cm$^2$) for 3.1 h, which corresponded to about 50% of the theoretical capacity of the electrode. Typically these cells reached a voltage of 2.66 to 2.72 V at the end of charge. They were when discharged at 0.288 A (25 mA/cm$^2$) to 1.75 V, which corresponded to 100% depth of discharge (DOD).

Since the cells were run in a flooded, vented-type configuration, the electrolyte composition had to be adjusted periodically by adding distilled water to compensate for water loss during gassing on overcharge; the onset of gassing occurred at a cell voltage of about 2.4 V. This is not a problem with other test cells which were sealed, gas recombinant cells. The cells were terminated when they failed to deliver a utilization greater than 20% of the calculated theoretical capacity of the negative electrode.

Figure 4:
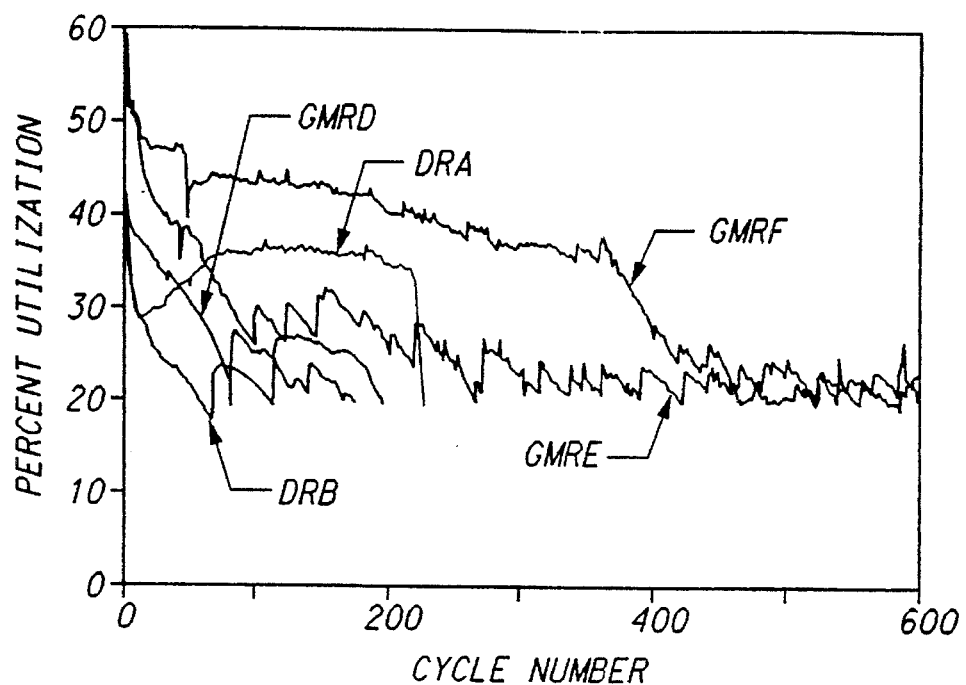
FIG. 4 is a diagram of percent utilization as a function of battery cycles (cycle life data).

FIG. 4 shows utilization of electrode plotted versus the life cycle of the cell. Percent utilization is defined as the (actual discharge capacity/theoretical electrode capacity)× 100. DRA is the beaker cell with stirred, flooded electrolyte containing a standard DR negative versus a solid, lead-sheet counter electrode and DRB is the trielectrode cell with the standard DR (Delco Remy) negative versus standard DR positives. The high utilization observed with the DRA cell was attributed to the fact that as the electrode cycled, the thickness of the electrode and presumably the porosity of the electrode, increased with cycling; the catastrophic loss in capacity at the end of its cycle life, at about 225 cycles, was due to the loss of adhesion of the electrode's active material from the current collector.

Very clearly, the new process (GMRE) is simpler and potentially less expensive than the previous process (GMRD), since the acetic acid treatment of the leady-oxide was eliminated from the overall process. Furthermore, the modified process had no deleterious effect on the cycling performance of the negative electrode. In fact, the cycle life test data was, at least as good as, or slightly better than the standard DRB negative electrode, when tested under comparable test conditions.

The effect of replacing the untreated Fitzgerald leady-oxide (GMRE) with an equal amount of a Hammond leady-oxide (GMRF) that had less metallic lead content, but a significantly greater BET surface area, was evaluated. The new formulation (GMRF) was evaluated in a trielectrode cell. FIG. 4 shows a plot of the utilization versus cycle life for GMRF compared to DRA and GMRE. The latter formulation had a higher utilization throughout cycle life testing, than either the standard DR negative cycled in a beaker cell under stirred, flooded conditions, or the previous formulation (GMRE) that used a lower BET surface area leady-oxide in the paste. Very clearly, the use of a higher surface area leady-oxide has a beneficial effect on the utilization of the negative electrode.

At about 380 cycles, the utilization for cell GMRF decreased markedly, and performed at about the level observed for the GMRE cell. When the cells were taken apart at the end of the test, it was discovered that there was absolutely no active material remaining on the positive grids adjacent to where the negative had been positioned in the cell case. It is interesting to note that although the positive active material had been removed from the grid, the grid itself was fully intact. In spite of this, the electrode gave a utilization of greater than 20% for more than 600 cycles at 100% DOD.

It is possible to predict that all three of the newly developed GMR electrodes would have a pickling heat (in 1.280 specific gravity sulfuric acid) less than that of the standard negative electrode. The GMRD, GMRE, and GMRF electrode would be expected to have a pickling heat of about 20%, 37%, and 55%, respectively, that of the standard negative electrode.

EXAMPLE 2

The full size negative electrodes were fabricated using standard negative grids used in Delco Remy, series 3000–4000, lead-acid EV batteries. The pasted area was 12.6 cm. ×8.5 cm., which corresponds to a geometric area of about 214.2 cm$^2$ (both sides).

The formulation used was a scaled up mix, which had been developed earlier with smaller electrodes as per Table 2 which gives compositions used for small electrode studies (GMRE) and the scaled up electrode (GMREL). The scaled up GMREL electrode had a theoretical capacity of 12.9 Ah and a paste density of 0.33 g/cm$^3$ (0.12 in. thickness); the standard DR electrode had a nominal theoretical capacity of 14.7 Ah and a paste density of 4.1 g/cm$^3$ (0.062 in. thickness). The GMREL electrode was hand pasted and was not pressed to a standard (shimmed) thickness.

Trielectrode Cell Assembly

The GMREL electrode was evaluated between two standard positive electrodes in a sealed (gas recombinant) trielectrode (baggy cell) configuration. The positive electrodes were taken from a cell which had been previously formed in a flooded condition. For purposes of comparison, a standard Delco Remy negative was also assembled in the same baggy cell configuration, DRC1. In these experiments, the cells were cycled in a starved electrolyte condition (see below) and the negative electrode limited the capacity of the cell, even near the end of cycle life (see latter).

DRC1 Cell

All the Delco Remy positives and negatives used in this study were wet formed by a tank formation process that involved a five-step procedure including traditional batch curing steps requiring 4 days at controlled temperature of 120° to 140° F. and 67% relative humidity.

The DRC1 control cell was used to compare performance of the new negative electrode GMREL. The cells used a central negative configuration (+/–/+). The cells were assembled with a dry mat and then the entire cell stack was immersed in 1.280 specific gravity sulfuric acid to saturate the mat with electrolyte. Before assembly, the standard Delco Remy separator(s) (Hollingsworth and Vose 260 g/m$^2$ fiberglass mat 0.060 in. thick) was cut to size and weighed dry, folded in half, then a wet formed negative was inserted in the center. Wet formed positives were positioned on each side of the negative electrode. A polyethylene (P) sleeve, about 5.5 in. long, was placed around the cell stack (P/+/S/ –/S/+/P) and heat sealed.

The cell stack assembly was placed between the Plexiglas end plates, compressed to the desired cell thickness (allowing for all of the additional components added during assembly), and the whole assembly was weighed. After the cells were compressed, a small pinhole was made through both bags to remove excess air from the head space. The pin hole was resealed with a soldering iron (round tip), and sealed with the Neoprene adhesive. The cell was now ready to be cycle life tested (see Table 3).

TABLE 3

| CYCLING CONDITIONS FOR DRC1 | |
|---|---|
| Cycle Number(s) | Conditions |
| Formation | The DR positives and negatives were beaker formed in flooded electrolyte. |
| 1D | Discharged (starved electrolyte) in the trielectrode configuration at 3.125 A (14.9 mA/cm$^2$) to 1.75 V. |

TABLE 3-continued

CYCLING CONDITIONS FOR DRC1

Figure 6:
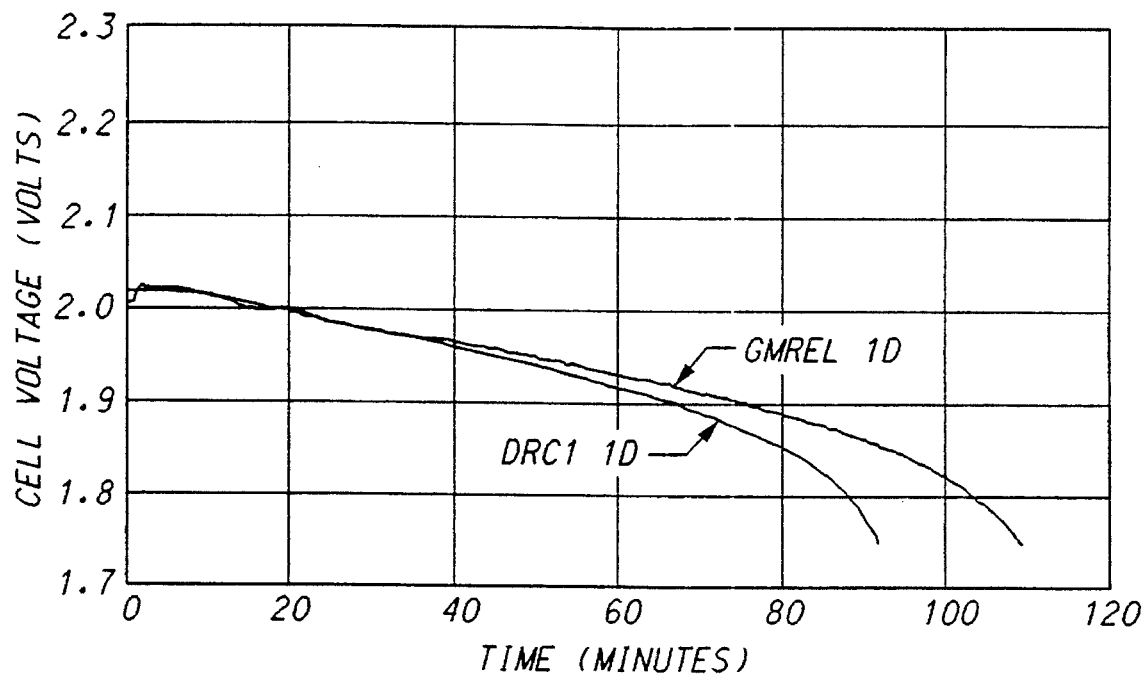
FIG. 6 contains plots of the first discharge curve of cells.

| Cycle Number(s) | Conditions |
| --- | --- |
| | See FIG. 6. |
| 2 | Charged @ 1.875 A (9 mA/cm$^2$), 2.5 V, 4 h. Discharged @ 3.125 A to 1.75 V. |
| 26 | Charge time changed from 4 to 5 h. |
| 41–48 | Cycled on the Maccor cycler, 1.875 A, 2.5 V lid, 4 h, 10% |
| 48 | Cell resealed with Neoprene adhesive cement. |
| 49 | Voltage lid changed from 2.5 to 2.7 V; 2 cycles per day and cell placed on open circuit over the weekend. |
| 78–87 | Cycled continuously with no open circuit stands except for 10 minutes between charge and discharge. |
| 88 | Same regimen as cycle 49. |
| 167 | Cycled continuously all week with an open circuit stand on the weekend. |
| 193 | Interrupted cell tests for 16 days to upgrade Data Acquisition System. |
| 225 | Interrupted cell tests for 2 weeks for the General Motors shut-down. |
| 226 | Same regimen as cycle 49. |
| 394 | At the end of the discharge, the bag was opened, and a Hg/Hg$_2$SO$_4$ reference electrode was inserted making contact with the separator mat, which was wrapped around the negative electrode. The bag was resealed with Neoprene, allowed to dry for 2 hours placed on charge, and allowed to sit on open-circuit over the week end. |
| 430 | The cell was terminated. |

GMREL Cell

This trielectrode cell, with a central negative configuration, contained the new GMR&D developed negative electrode formulation fabricated using the process shown in FIG. 3. The cell was assembled with a dry mat and the entire cell stack was immersed in 1.280 specific gravity sulfuric acid to saturate the mat with electrolyte as described in connection with the DRC1 cell. The cell stack was conditioned using a constant current of 1.83 A for 5.05 h (9.247 Ah). After conditioning the negative electrode, the assembly was lifted from the beaker and allowed to drip for about 1 minute to remove excess electrolyte. The cell assembly was then weighed.

The cell stack was inserted into the compression fixture described earlier and the whole assembly was compressed to the desired thickness. After the cell stack had been compressed, it was allowed to drain for approximately an additional 2 minutes, then it was blotted dry. The screws were then loosened and the cell assembly was removed and then weighed. The cell stack was doubled-bagged, sealed, compressed to the desired thickness, excess air removed from the cell, resealed, and prepared for cycle life testing (see Table 4).

TABLE 4

CYCLING CONDITIONS FOR GMREL

| Cycle Number(s) | Conditions |
| --- | --- |
| Formation | The DR positives were beaker formed in flooded electrolyte (4). The negative, along with the previously formed positives, were given a conditioning charge in the trielectrode configuration (flooded with acid) at a constant current of 1.83 A for 5.05 h. |
| 1D | Discharged (starved electrolyte) in the trielectrode configuration at 3.125 A (14.9 mA/cm$^2$) to 1.75 V. See FIG. 6. |
| 2 | Charged @ 1.875 A (9 mA/cm$^2$), 2.5 V, 4 h. Discharged @ 3.125 A to 1.75 V. |
| 42–48 | Cycled on the Maccor cycler; 1.875 A, 2.5 V lid, 4 h, 10% overcharge limit. |
| 49 | Cell resealed with Neoprene cement. |
| 49 | Voltage lid changed from 2.5 to 2.7 V; 2 cycles per day and open circuit over the weekend. |
| 78–87 | Cycled continuously with no open circuit stands except for 10 minutes between charge and discharge. |
| 88 | Same regimen as cycle 49. |
| 166 | Cycled continuously all week with an open circuit stand on the weekend. |
| 192 | Interrupted cell tests for 16 days to upgrade data acquisition system. |
| 224 | Interrupted cell tests for 2 weeks for the General Motors shut-down. |
| 225 | Same regimen as cycle 49. At the end of discharge, the bag was opened, and a Hg/Hg$_2$SO$_4$ reference electrode was inserted making contact with the separator mat, which was wrapped around the negative electrode. The bag was resealed with Neoprene, allowed to dry for 2 hours placed on charge, and allowed to sit on open-circuit over the weekend. |
| 660 | The cell was terminated. |

Figure 5:
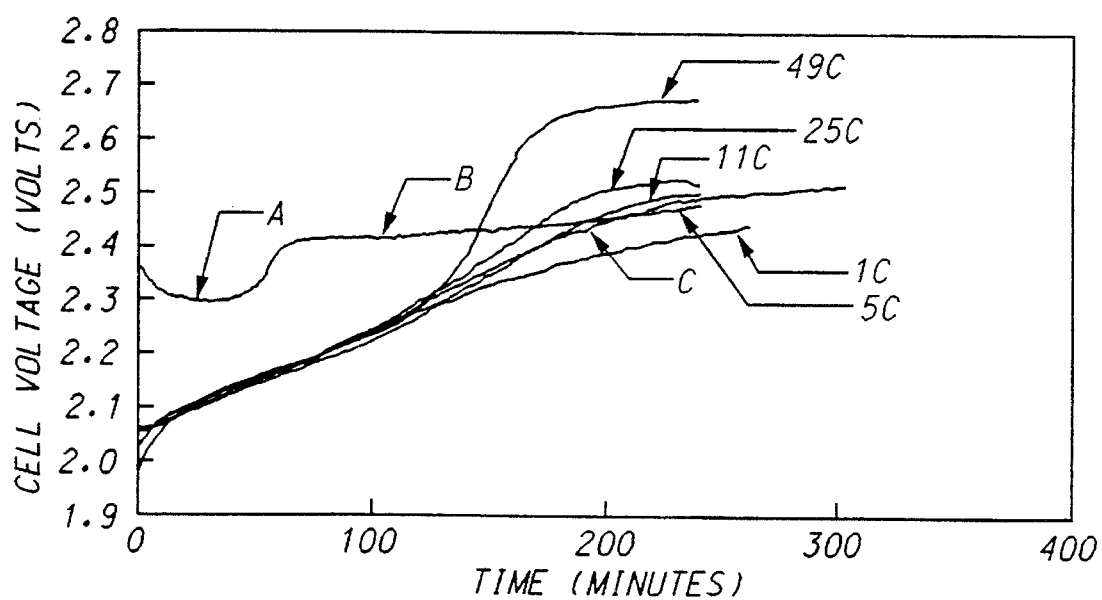
FIG. 5 contains plots of charging curves as a function of cycle number for full size EV electrode.

FIG. 5 shows a plot, with segments labelled A, B, and C, of the cell voltage versus time for cell GMREL during the initial conditioning cycle, which was carried out in a vented cell because the positives had already been formed and excessive gassing on the positives would have damaged the baggy cells. The cell was charged at 1.833A for 5.05 h (which corresponds to 71.7% of the theoretical capacity of the negative electrode) and the cell was later discharged (see FIG. 6) in the assembled baggy cell at 3.125 A to a 1.75 V cutoff giving a discharge capacity of 5.677 Ah (which corresponds to a utilization of 44%); it is very noteworthy that the first discharge for the GMREL cell was virtually identical to the first discharge of the fully cured and formed DR plate. The charge curve (FIG. 5) shows three distinct regions, A, B, and C. Region A is associated with the conversion of PbO to Pb in the total charge input 13.0%) in this region is the same order of magnitude as the amount of PbO present in the electrode (14.6%). The onset of region C occurred at about 55.6% of the theoretical capacity of the negative electrode. Both regions A and B are not present per se in a fully developed negative electrode (see FIG. 5). Earlier results have shown that it is necessary to reach the onset of region C to have a stable open circuit voltage, which translates into acceptable capacity on the next successive discharge. How far one enters into region C will depend upon what utilization will be required during the subsequent discharge while not wishing to be held to any particular theory, one explanation for what is happening is that the low surface active lead material (Quenell) forms the primary lead structure (surrounded by the insulator PbO and the other additives) which provides the mechanical backbone and serves as the current collector of the electrode structure. With the onset of the preconditioning charge, a high surface area secondary lead structure (from the high surface area leady-oxide) is formed which forms a strong interconnecting network between the primary lead structure and the grid interface. The initial voltage spike is presumably associated with a nucleation over-voltage associated with the nucleation of Pb from PbO. In the standard process, the grid corrosion taking place during the curing process promotes the active mass/grid bond. It is generally accepted that a secondary lead structure (with standard plates) is associated with the performance characteristics (e.g., discharge capacity, utilization, etc.) of the electrode.

In a one-step process, the structure of the negative electrode is fully developed during the preconditioning cycle. This is in contrast with the standard process, where the structure develops continuously during a multi-step process during the fabrication process and during the first few cycles the negative is cycled in practice. Very clearly, the one-step process offers the potential advantage of producing a negative that may be more reproducible to fabricate than the standard electrode.

Cycle Life Data

Figure 7:
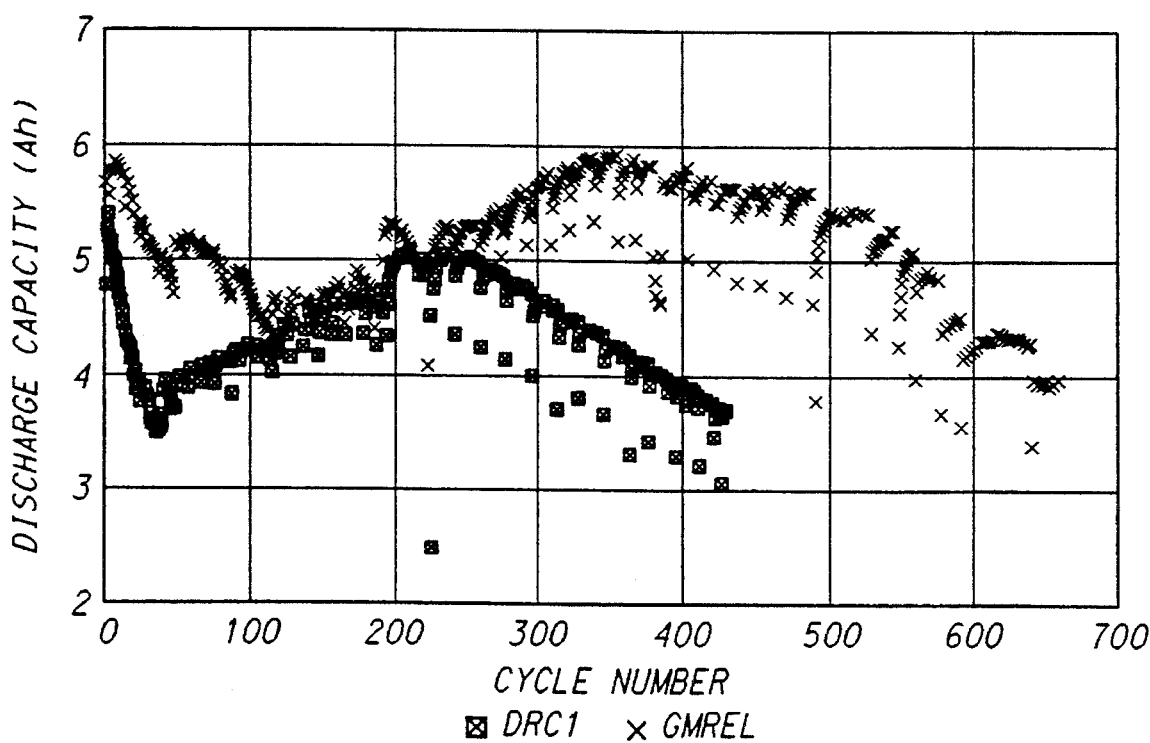
FIG. 7 contains plots of discharge capacity versus cycle number for full size EV trielectrodes.
Figure 8:
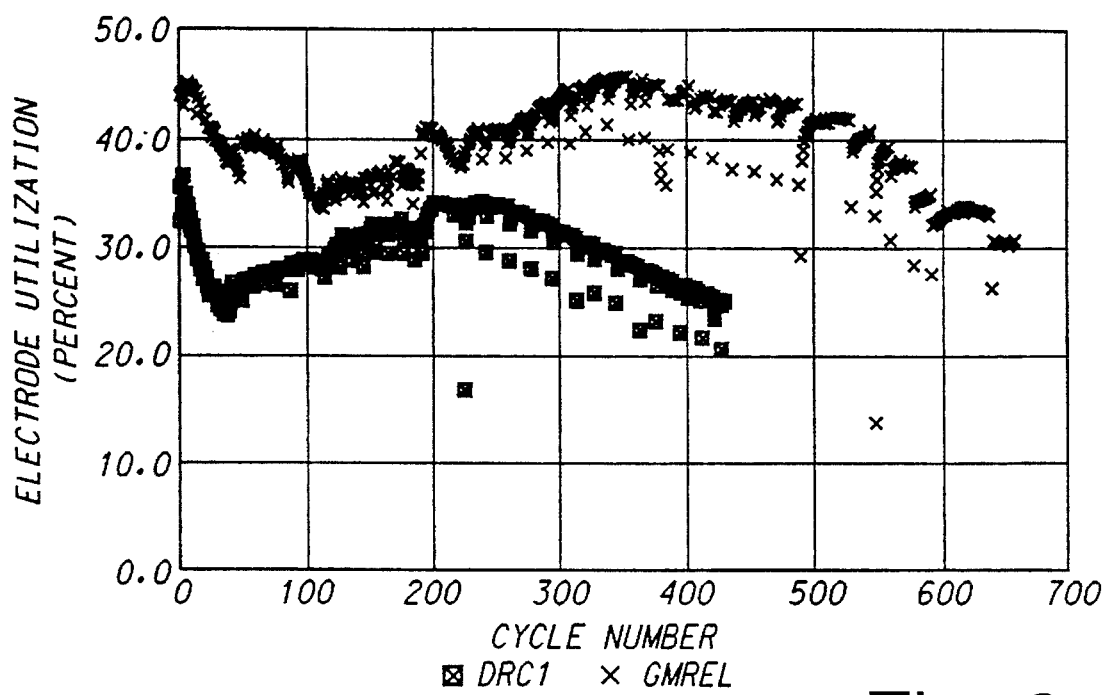
FIG. 8 is a diagram of percent utilization as a function of battery cycles for full size EV trielectrodes.

FIG. 7 shows a plot of the discharge capacity (Ah) versus cycle number for cells DRC1 and GMREL. Although the DRC1 cell gave rise to anomalous behavior early in cycling (dropped below 4 Ah) and the cycling regimen had to be modified (see Table 1), the cycle life obtained was typical and as expected based on data with other central positives. The GMREL electrode achieved about 660 cycles at 100% DOD compared to about 385 cycles for the DR control, using a 4 Ah cutoff. FIG. 8 shows the data in a slightly different way, in that percent utilization is plotted versus cycle number, where percent utilization is defined as the (discharge capacity/theoretical electrode capacity)×100. In this way, the data is normalized in terms of the theoretical capacity of each of the negative electrodes used in the study. Although the GMREL electrode had less active material in the electrode than the DRC1 cell, the improvement in the utilization, as a function of cycle life, is even more apparent. Another way of saying this is that with less active material, the GMREL electrode out performs the standard DR negative, both in terms of utilization and cycle life.

Figure 9:
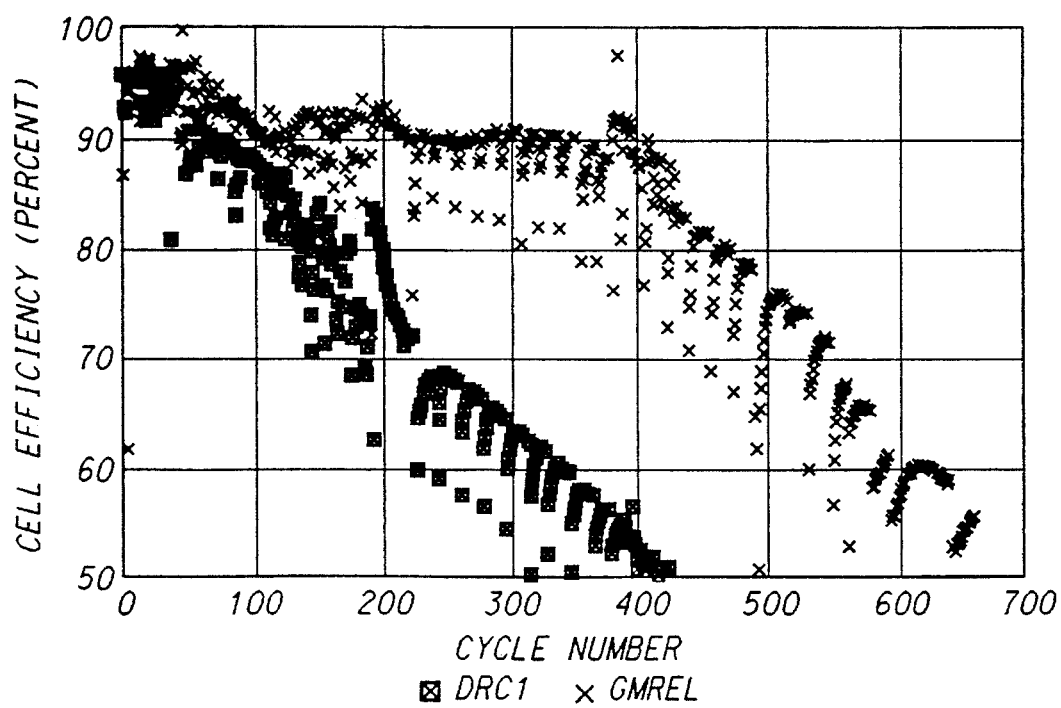
FIG. 9 contains plots of percent cell efficiency versus cycle number for full size EV trielectrodes.
Figure 10:
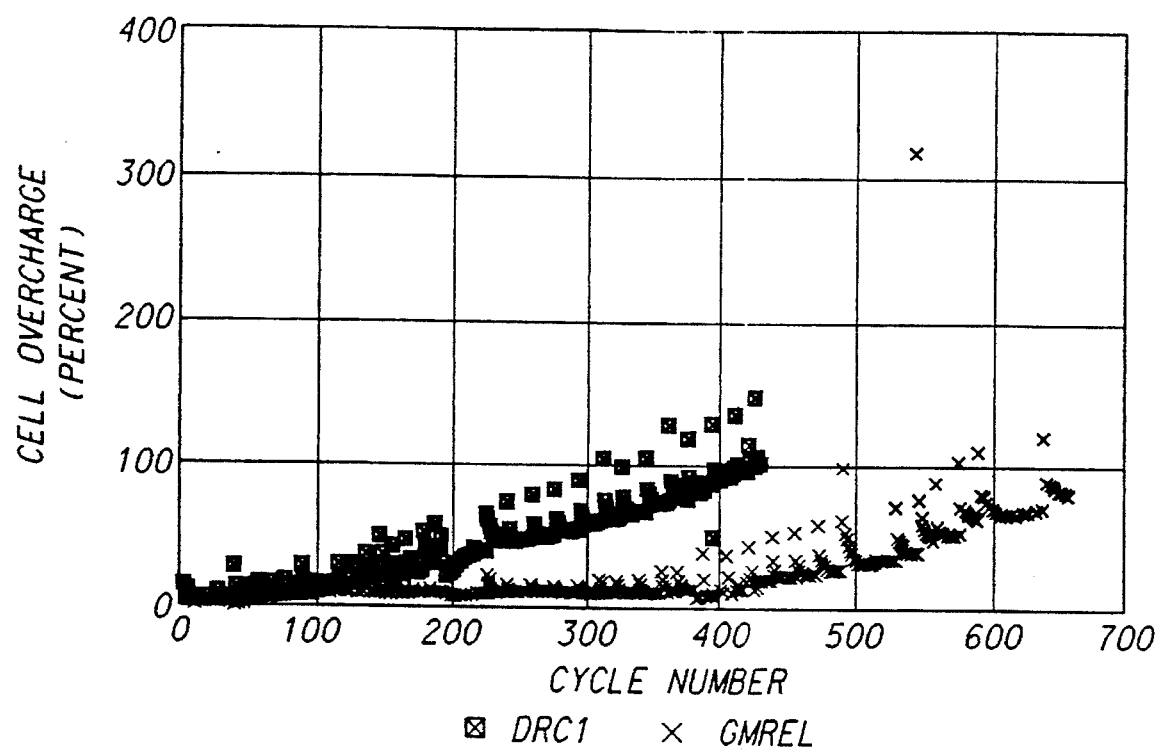
FIG. 10 contains plots of percent cell over-voltage versus cycle number for full size EV trielectrodes.

FIG. 9 shows a plot of the cell efficiency versus cycle life for the three cells; very clearly the GMREL cell operated at a very high efficiency (about 90% for over 400 cycles) throughout cycling; the control cell, DRC1 began to lose efficiency (less than 90%) after about 100 cycles, where cell efficiency is defined as the (discharge capacity/previous charge capacity)×100. Another way to consider the data is to plot overcharge versus cycle number. The results in FIG. 10 show a plot of percent overcharge versus cycle number, where overcharge is defined as (charge capacity/capacity of the subsequent discharge)×100; in these experiments, the overcharge was not controlled automatically. Very clearly the overcharge on the DR control cells are excessive and would suggest the following: excessive gas evolution at the end of charge (from both the positive and the negative electrodes) and massive grid oxidation at the positive electrodes.

The weight loss of electrolyte in the cells, was monitored as a function of cycle life. Cells DRC1 and GMREL (operative at a 2.7 V lid) show a slight weight loss, about 3.5 to 6.5 g or about 4.9 to 7.4% of the original amount of electrolyte present, possibly due to hydrogen gassing at the negative. Although there was positive pressure throughout cycle-life testing, there was no evidence of excessive bulging of the plastic bags, indicating that the cells were behaving well, as gas recombinant cells.

It was observed that all the cells self-discharged partially when placed on open-circuit stand over the weekend in a charged stated. The reactions generally associated with the discharge of either the positive and/or the negative electrodes are known and will not be repeated here. To determine whether self-discharge was due to either the positive and/or the negative electrodes, $Hg/Hg_2SO_4$ reference electrodes were sealed into the failing cells and the cells were cycled in the normal way. For cell DRC1, self-discharge seems to be associated predominantly with the positive electrode, which had an open circuit decay of 65 mV; the negative did not have any significant drop in open circuit voltage. These results were also confirmed for the GMREL electrode.

Post Test Analysis

When the cells were disassembled, it was found that the top straps on the positive electrodes had experienced extensive corrosion and had become detached from the electrode current collector, thus accounting for the catastrophic failure at the end of life. Therefore, cell failure was due to positive grid oxidation, even though the cells cycled with excess positive capacity. Because the GMREL cell had a better cell efficiency (see FIG. 9) than the Delco Remy control cell, the operating life of the positives in the GMREL cell was longer than in the Delco Remy cell. The negative electrodes were in good structural condition. However, the plates were somewhat sulfated, in the lower half of the electrode. There was no shrinkage (i.e., pellets pulling away from the grid) or expansion (i.e., loss of contact with the grid) of the negative active material.

The negative electrodes of the invention are at least as good as and in some aspects superior to standard electrodes and the method for their formulation is easier than that for standard negative electrodes. The life cycle of the cell with the electrode of the invention was 660 cycles at 100% depth of discharge; the control cell electrode reached the 4 Ah cut off at about 385 cycles, under comparable test conditions. The process of the invention is advantageous for SLI and/or electric vehicle lead-based batteries because it is simpler and provides a more reproducible pasting chemistry. Other advantages are that the process of the invention eliminates the standard acid pasting process and replaces it with a water-based process with a simpler pasting chemistry. This eliminates the complex basic lead sulfate reactions found in the standard process. The invention eliminates the curing process by using partially charged (metallic lead) active material. This allows the electrode to be fabricated in a continuous process rather than the standard batch process. This also eliminates the use of a curing room and curing time and saves 4 days in the processing of the plates. The invention reduces the amount of pickling reactions during the pasted and acid fill steps, by using partially charged (metallic lead) active materials. This permits better control of the pasting chemistry and processing of the plate. The invention reduces significantly the time required to form the plates for production thus allowing formation to be completed in one production shift.

Finally, the invention provides a performance level, in terms of utilization and life cycle, that is at least as good as or better than standard negative electrodes presently used. The process offers a significant advantage for cost savings by lowering the manufacturing cost of fabricating lead acid based battery negatives in a one-step process. The structure of the negative electrode is fully developed during the conditioning cycle. This is in contrast with standard processes where the structure develops continuously during a multi-step process during fabrication and during the first few cycles. The one-step process offers the advantage of producing a negative that is potentially more reproducible to fabricate than the standard electrode and could significantly alter the way lead acid battery plates are manufactured.

While this invention has been described in terms of certain embodiment thereof, it is not intended that it be limited to the above description, but rather only to the extent set forth in the following claims.

The embodiments of the invention in which an exclusive property or privilege is claimed are defined in the appended claims.

We claim:

1. A method of making a negative electrode for a lead-acid battery, the electrode comprising a precharged active material which is partially or fully charged, the method comprising the steps of:
   a. forming a lead-based powder having a metallic lead content of at least about 95 weight percent;
   b. forming a leady-oxide powder having a lead oxide content of at least about 85 weight percent and a BET surface area of at least about 0.1 meter square per gram;
   c. combining the powders to provide on the basis of 100 parts by weight of total powder, 65 to 80 parts of the lead based powder and 20 to 35 parts of the leady-oxide powder and forming an aqueous mixture of the powders;
   d. applying the mixture to at least one side of a grid; and
   e. drying the applied mixture.

2. The method according to claim 1 wherein the lead based powder constitutes about 70 to about 75 parts by weight of the total powder.

3. The method according to claim 1 wherein the leady-oxide powder constitutes about 25 to about 30 parts by weight of the total powder.

4. The method according to claim 1 wherein the lead-based powder has a particle size less than about −325 mesh.

5. The method according to claim 1 wherein a major portion of the leady-oxide is in the form of PbO or $Pb_3O_4$.

6. A lead-based precharged active material which is partially or fully charged, said active material comprising intermingled first and second powders, the first powder having a metallic lead content of at least about 95 percent by weight and a surface area of at least about 0.1 $m^2$/gram, the second powder having a lead oxide content of at least about 85 percent by weight and a surface area of at least about 0.8 $m^2$/gram where a major portion of such lead oxide is in the form of PbO or $Pb_3O_4$; and where on the basis of 100 parts by weight of total powder, the first powder constitutes at least about 70 parts, and the second powder constitutes the balance.
   c. combining the powders to provide on the basis of 100 parts by weight of total powder, 65 to 80 parts of the lead based powder and 20 to 35 parts of the leady-oxide powder and forming an aqueous mixture of the powders;
   d. applying the mixture to at least one side of a grid; and
   e. drying the applied mixture.

7. A lead-based precharged active material which is partially or fully charged, said active material comprising intermingled first and second powders, the first powder having a majority of its content, by weight, constituted by metallic lead and the second powder having a majority of its content, by weight, constituted by lead oxide, where at least a portion of such lead oxide is in the form of PbO or $Pb_3O_4$; and where on the basis of parts by weight of total powder, the first powder is present in an amount of at least about 60 percent by weight; and the second powder having a surface area of at least about 0.1 meter square per gram.

8. The lead-based precharged active material according to claim 7 which is charged to at least about 30 percent of its theoretical capacity, wherein the first powder has a metallic lead content of at least about 80 percent by weight, the second powder has a lead oxide content of at least about 70 percent by weight and where at least 50 percent of such lead oxide is in the form of PbO or $Pb_3O_4$.

9. A lead-based precharged active material which is partially or fully charged, said active material comprising intermingled first and second powders, the first powder having at least about 80% of its content, by weight, constituted by metallic lead and the second powder having at least about 70% of its content, by weight, constituted by lead oxide, where at least a portion of such lead oxide is in the form of PbO or $Pb_3O_4$ and the second powder having a surface area of at least about 0.1 meter square per gram; and where on the basis of parts by weight of total powder, the first powder is present in an amount of at least about 60 percent by weight.

* * * * *